United States Patent
McClendon et al.

(10) Patent No.: US 6,462,942 B1
(45) Date of Patent: Oct. 8, 2002

(54) ATTACHMENT DEVICE FOR HANDHELD COMPUTERS

(75) Inventors: Philip Scott McClendon, Cupertino; Yoon Kean Wong, Menlo Park; Cheri Nola Leonard, San Jose, all of CA (US)

(73) Assignee: Palm Inc., Santa Clara, CA (US)

( * ) Notice: Subject to any disclaimer, the term of this patent is extended or adjusted under 35 U.S.C. 154(b) by 0 days.

(21) Appl. No.: 09/872,649

(22) Filed: May 31, 2001

(51) Int. Cl.[7] .................................................. G06F 1/16
(52) U.S. Cl. ........................ 361/683; 361/699; 345/168; 235/145
(58) Field of Search ................................. 361/683, 687, 361/699, 700, 680, 681; 364/708.1; 341/22; 345/168–172, 905; 234/145

(56) References Cited

U.S. PATENT DOCUMENTS 6,011,699 A * 1/2000 Murray et al. .............. 361/814
6,219,257 B1 * 4/2001 Arnold ........................ 361/814
6,278,481 B1 * 8/2001 Schmidt ....................... 348/64
6,317,313 B1 * 11/2001 Mosgrove et al. .......... 361/680

* cited by examiner

*Primary Examiner*—Darren Schuberg
*Assistant Examiner*—Hung Van Duong
(74) *Attorney, Agent, or Firm*—Van Mahamedi; Hickman Palermo Truong & Becker LLP

(57) ABSTRACT

An attachment device is provided for a handheld computer. The attachment device includes a first structure that attaches into a back face of a handheld computer. A second structure is moveably coupled to the first structure, and is positionable against the front face of the handheld computer. The first structure may couple to the back face of the handheld computer using a spring-loaded latch mechanism or other detachable coupling. An embodiment provides that the attachment device is electronically enabled to include one or more electrical components. The attachment device may also include a connector to electrically couple with a peripheral connector of the handheld computer.

37 Claims, 13 Drawing Sheets

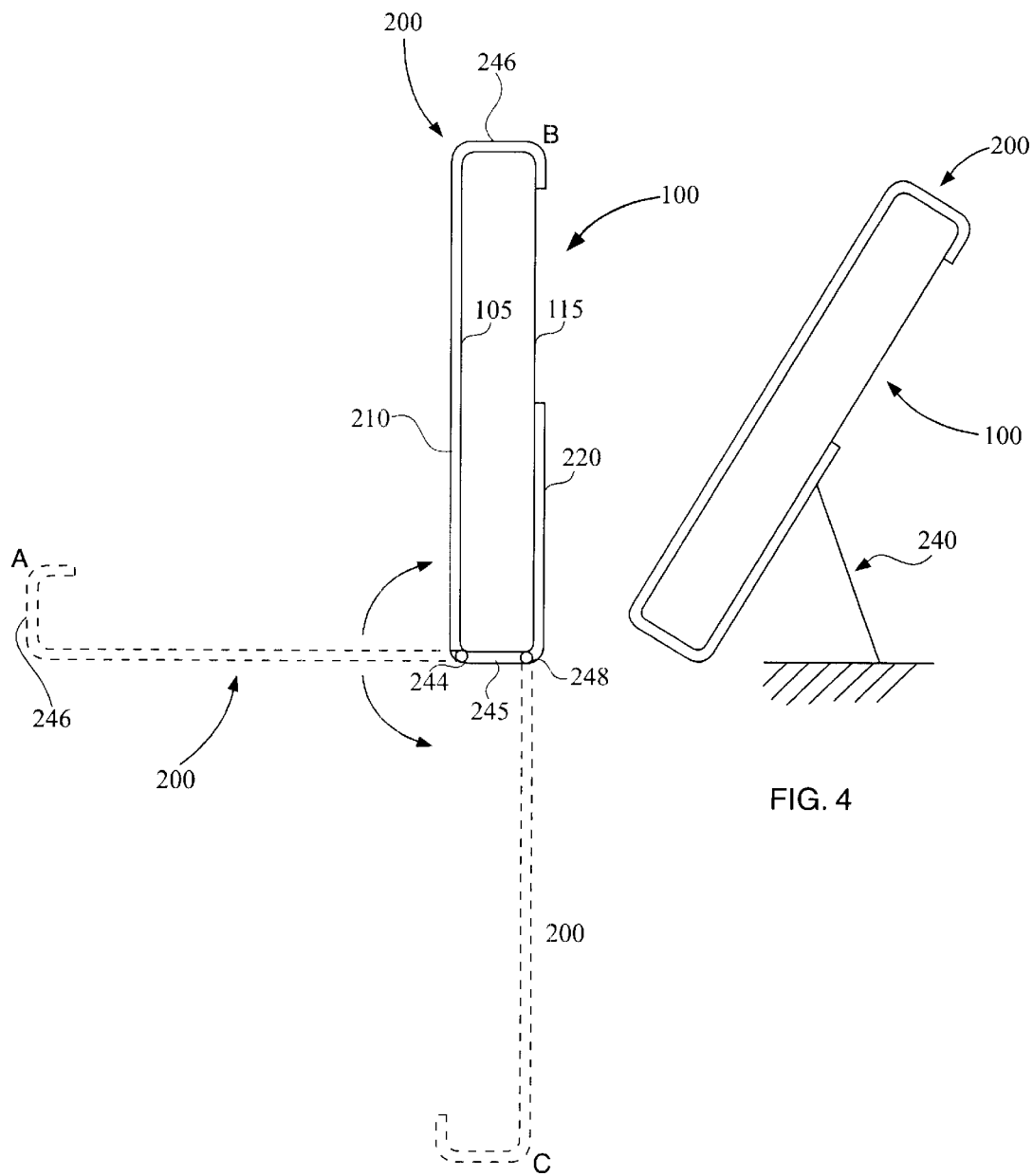

ATTACHMENT DEVICE FOR HANDHELD COMPUTERS

FIELD OF THE INVENTION

The present invention relates to handheld computers. In particular, the present invention relates to attachment devices for handheld computers.

BACKGROUND OF THE INVENTION

Handheld computers, typically referred to as personal digital assistants (PDAs), have small sizes for mobility. The functions that are typically performed by handheld computers are often limited to accommodate the small size. In particular, hardware components and resources may be spared on the handheld computer to preserve size, battery power and/or processing resources.

To conserve size while providing functionality, many handheld computers offer attachment modules and devices. These devices may be in the form of a card or extension. The attachment devices may include components such as additional memory, a modem, or a battery pack.

Some accessory devices for handheld computers include covers and encasements to protect the device during its use. Sometimes, electronic hardware components are incorporated into the housings of the covers and encasements. For example, PALM V organizers manufactured by PALM INC. include an accessory slot that extends lengthwise along both lateral faces of the device. One of the accessory slots may be used to carry an accessory device, and the accessory device may be electronically enabled. For example, a voice-recorder may attach into the accessory slot. The voice recorder may include a housing that extends over a front face of the organizer. Similar encasements also include a connector that is positioned to mate with a serial connector on the PALM V.

These devices provide examples of covers and encasements that electronically couple to the handheld computer while being used to protect the handheld computer. Similar devices are described in: U.S. patent application Ser. No. 09/586,541, entitled "Smart Cover for a Handheld Computer," filed May 31, 2000; patent application Ser. No. 09/572,673, entitled "Keyboard for a Handheld Computer," filed May 16, 2000; and patent application Ser. No. 09/573,451, entitled "Electronically-Enabled Encasement for a Handheld Computer," filed May 16, 2000.

SUMMARY OF THE INVENTION

An attachment device is provided for a handheld computer. The attachment device includes a first structure that attaches into a back face of a handheld computer. A second structure is moveably coupled to the first structure, and is positionable against the front face of the handheld computer. The first structure may couple to the back face of the handheld computer using a spring-loaded latch mechanism or other detachable coupling.

An embodiment provides that the attachment device is electronically enabled to include one or more electrical components. The attachment device may also include a connector to electrically couple with a peripheral connector of the handheld computer.

BRIEF DESCRIPTION OF THE DRAWINGS

Embodiments of the invention are illustrated by way of example, and not by way of limitation, in the figures of the accompanying drawings. Like reference numerals are intended to refer to similar elements among different figures.

FIG. 3 is a side view of an attachment device coupled to a handheld computer, the attachment device being positionable between a closed position and an extended position, under an embodiment of the invention.

FIG. 4 is a side view of an attachment device and handheld computer assembly supported by a stand, under an embodiment of the invention.

DETAILED DESCRIPTION OF THE INVENTION

Embodiments of the invention describe an attachment device for a handheld computer. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

A. Overview

In an embodiment, an attachment device for a handheld computer includes a first structure, a second structure and a coupling mechanism. The coupling mechanism extends from the first structure to insert into the back face of the handheld computer and detachably couple the attachment device to the handheld computer. The second structure is moveably coupled to the first structure, and can be extended into a position adjacent to the front face of the handheld computer.

When the handheld computer is detachably coupled to the attachment device, the attachment device can be separated with manipulation of features integrated into the handheld computer and/or attachment device. The manipulation may be accomplished without use of external tools, such as screw drivers. The coupling mechanism may be biased to create the detachable coupling. Examples of coupling mechanisms include snap-in or friction fitting members and spring-loaded latch members. Detachable couplings do not include, for example, mechanical fasteners such as screws and bolts, or adhesives.

Among advantages, an embodiment allows for peripheral devices to be attached to handheld computers using a piggy-back configuration, where a back face of the handheld computer is used as an attachment platform for the peripheral device. Portions of the peripheral device may be extended over a front face of the handheld computer to provide protection of a display and other components of the handheld computer. Furthermore, the portions of the accessory device that extend over the front face of the handheld computer provide additional housing space for more spacious accessory components.

B. Housing Configuration For Attachment Device

Figure 1:
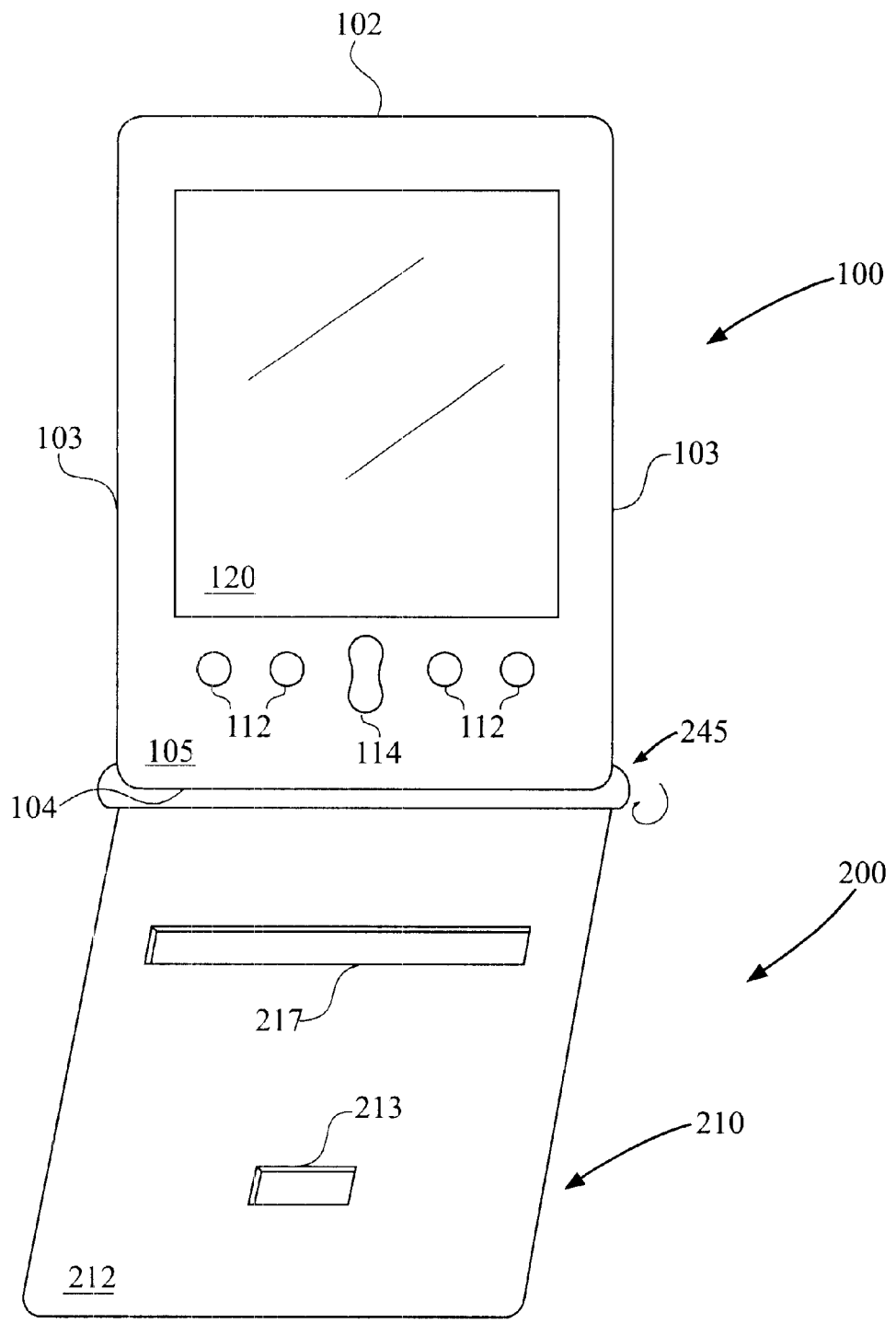
FIG. 1 is a frontal view of an attachment device coupled to a handheld computer, the attachment device being in a partially-extended position, under an embodiment of the invention.

FIG. 1 illustrates a handheld computer 100 coupled to an attachment device 200. The handheld computer 100 includes a display 120 provided on a front face 105. The front face 105 extends between a top 102 and a bottom 104, and between lateral sides 103. A length of handheld computer 100 extends between top 102 and bottom 104. A width of handheld computer 100 extends between lateral sides 103, 103. The display 120 may be contact-sensitive. A plurality of buttons 112 are provided on front face 105. A pivot button 114 may be centrally disposed between the plurality of buttons 112.

Examples of handheld computers for use with embodiments of the invention include personal digital assistants, such as those manufactured by PALM INC., or devices that operate a PALM operating system. Other examples of handheld computers include devices that operate a WINDOWS CE or POCKET PC operating system, manufactured by MICROSOFT.

Figure 2:
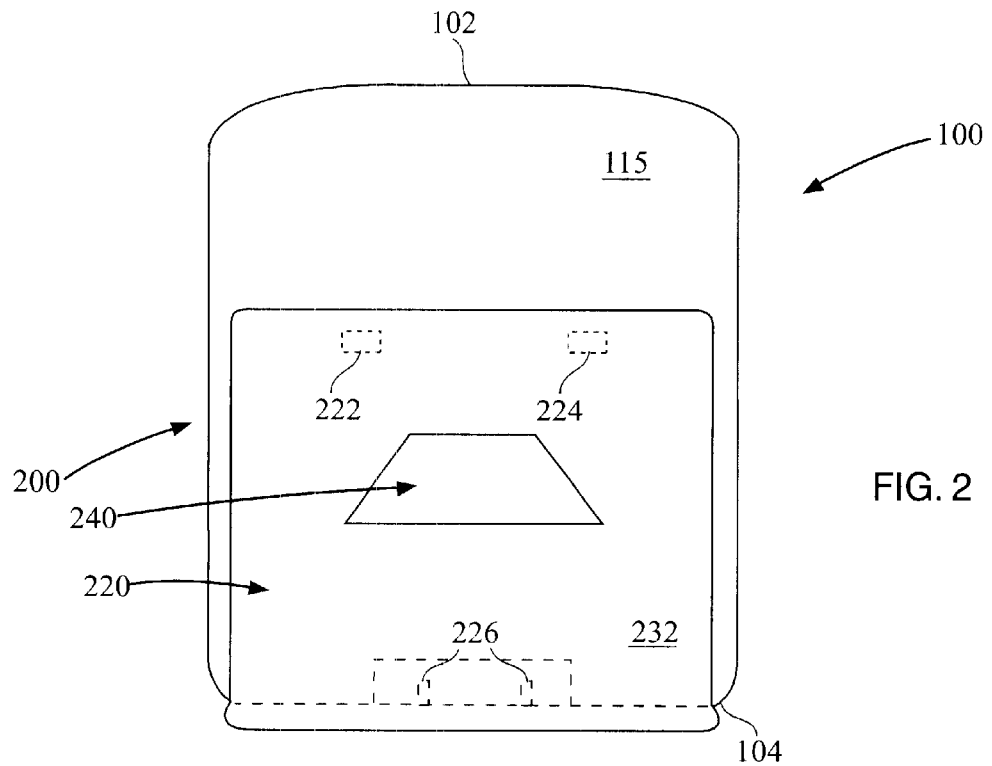
FIG. 2 is a back view of an attachment device coupled to a handheld computer, under an embodiment of the invention.

The attachment device 200 includes a front structure 210 moveably coupled to a back structure 220 (see FIG. 2). FIG. 1 shows front structure 210 in a partially-extended position so as to be oriented about 90 degrees with the front face 105 of handheld computer 100. The front structure 210 includes a back panel 212 that positions adjacent to the front face 105 of handheld computer 100 when front structure 210 is moved into a closed position, where back panel 212 is adjacent to front face 105. A connecting structure 245 couples front structure 210 to back structure 220 to enable front structure 210 to move from the partially-extended position to a fully-extended position (see position C, FIG. 5), or to a closed position (see position A, FIG. 5). The connecting structure 245 may be in the form of a hinge or similar structure.

The attachment device 200 may include one or more openings that expose portions of front face 105 when front structure 210 is moved into a closed position. In an embodiment, a first opening 213 is aligned to expose a portion of display 120 when front structure 210 is moved into closed position. A second opening 217 may also be provided to expose buttons 112, 114 when front structure 210 is in the closed position. As an alternative, front structure 210 may include translucent or clear portions, rather than openings, to expose portions of front face 105, such as a segment of display 120.

The front structure 210 is moveable from a partially-extended position into a closed position. In the closed position, the back panel 212 is adjacent front face 105 of handheld computer 100. An embodiment provides that an area of front structure 210 covers at least a majority of front face 105. In one embodiment, front structure 210 covers all of the periphery for display 120.

The attachment device 200 may be formed of/from one or more types of materials. In one embodiment, attachment device 200 is formed of a rigid material, such as plastic, metal or ceramic. In another embodiment, one or more surfaces of attachment device 200, such as front structure 210, back structure 220, and/or the back panel 212 of front structure 210, is formed of tensile material, such as leather, nylon or cloth. Specialty materials may also be used for front structure 210, such as NEOPRENE or titanium.

FIG. 2 is a back view of attachment device 200 coupled to handheld computer 100. A back structure 220 of attachment device 200 couples into a back face 115 of handheld computer 100. The back structure 220 extends from bottom 104 partially towards the top 102 of handheld computer 100. Other configurations may provide for back structure 220 to extend the full vertical (and horizontal) length of back face 115. When attachment device 200 is coupled to handheld computer 100, back structure 220 is upright relative to back face 115.

The back structure 220 detachably secures into back face 15 at multiple connection points 222, 224 and 226. In one implementation, back face 115 provides multiple connection points forming a spaced-apart or triangular arrangement on back face 115. An example of this configuration for connection points 222, 224 and 226 is provided by PDAs such as the PALM m500. The back structure 220 includes coupling mechanism having a first latch member 282, 284 (see FIG. 7) for connection points 222 and 224. The latch members for connection points 222, 224 extend into corresponding apertures (not shown) formed on back panel 115. As will be further described, latch members for connection points 222, 224 bias when they engage the corresponding apertures of handheld computer 100. The coupling mechanism of attachment device 200 may also include third members 286 for apertures 226. The third members 286 friction fit within corresponding apertures of handheld computer 100. The third members may perform functions for alignment, stabilization, and/or coupling. When back structure 220 is upright and coupled to handheld computer 100, a back panel 232 of back structure 220 forms an exterior of attachment device 200. In an embodiment, back panel 232 includes an extendible stand 240.

While embodiments described herein provide for back face 115 to include a triangular arrangement for connection points, other embodiments may employ fewer or greater number connection points, in different geometric configuration. For example, a configuration employed by PALM V organizers uses a single connection point on back face 115 to accommodate a piggy-back accessory device, such as described in U.S. Pat. No. 6,115,248.

FIG. 3 is a side view of handheld computer 100 coupled to attachment device 200, under an embodiment of the invention. The back structure 220 of attachment device 200 extends only over a portion of the vertical distance of back face 115. At least a portion of front structure 210 extends over the entire vertical length of front face 105. A top portion 246 of front structure 210 extends over the top 102 of handheld computer 100. The top portion 246 may extend a width of front structure 210. Alternatively, top portion 246 includes one or more strips that extend over top 102 so as to expose portions of a top face of handheld computer 100.

Figure 15:
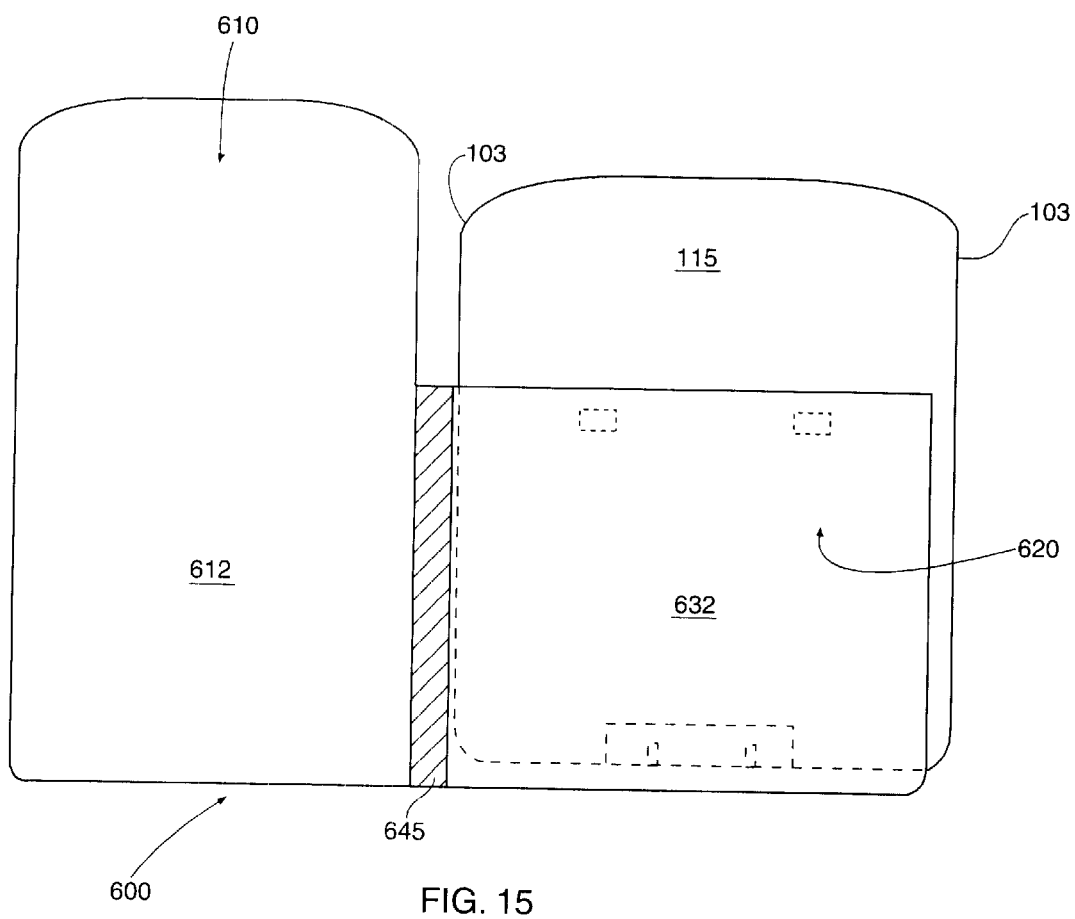
FIG. 15 is a back view of an attachment device having a housing configuration to couple into a back face of a handheld computer and extend laterally over the handheld computer's front face, under an embodiment of the invention.
Figure 16:
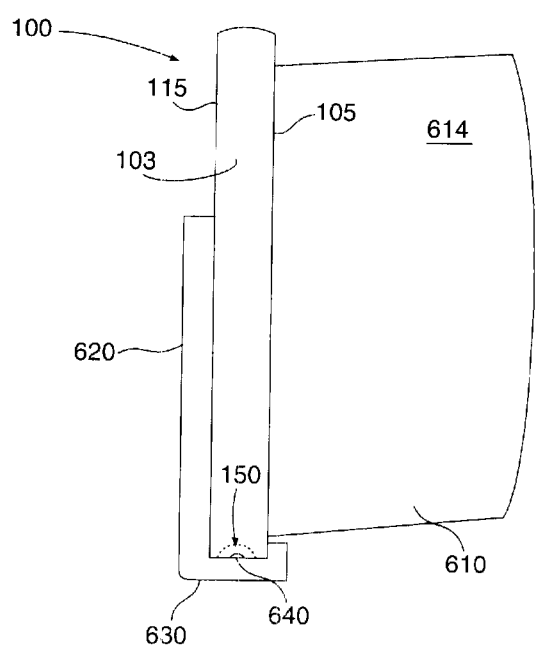
FIG. 16 is a side view of an attachment device having a housing configuration to extend laterally over a front of a handheld computer, under an embodiment of the invention.

The attachment device 200 includes connecting structure 245 that moveably connects front structure 210 to back structure 220. A position A (in phantom) shows front structure 210 in a partially-extended position, such as shown by FIG. 1. A position B shows front structure 210 in a closed position. A position C (in phantom) shows front structure 210 in a fully-extended position. In an embodiment, connecting structure 245 covers a bottom surface of handheld computer 100, while providing about 180 degrees of freedom to enable front structure 210 to move between positions A, B and C. In one implementation, connecting structure 245 is a double joint. A first pivot 244 of the double joint enables front structure 210 to move between positions A and B. A second pivot 248 of the double joint enables front structure 210 to move between positions A and C. As shown in FIGS. 15 and 16, the connecting structure 245 may alternatively be another hinge structure, such as a flex member that provides a slack length to enable front structure 210 to swing about back structure 220.

FIG. 3 illustrates handheld computer 100 and attachment device 200 in an upright position. The extendible stand 240 may be in a closed position, so as to be flush against the back panel 232. In FIG. 4, extendible stand 240 is moved from the closed position into an open position. The extendible stand 240 may be rested against a platform to support handheld computer 100 and attachment device 200 in a partially-upright position.

Figure 5:
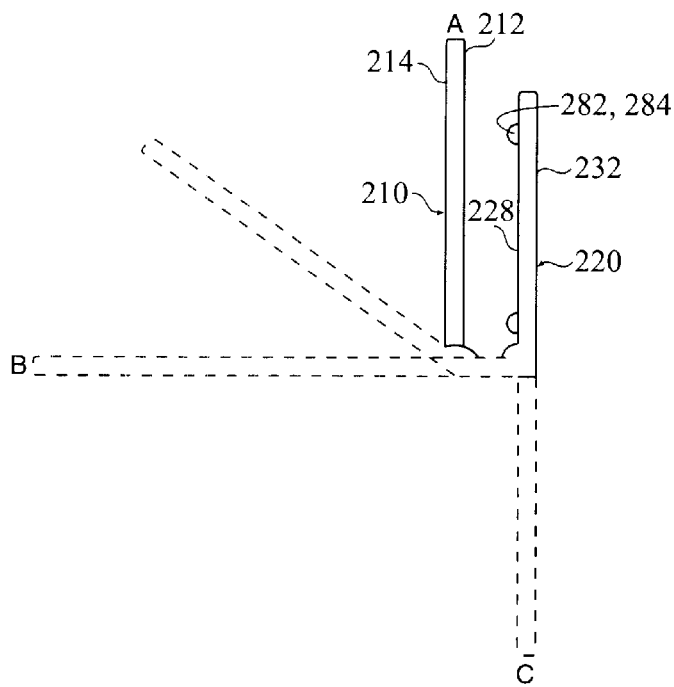
FIG. 5 is a side view of an attachment device, moveable to multiple positions, under an embodiment of the invention.

FIG. 5 is a side view of attachment device 200 isolated from handheld computer 100, under an embodiment of the invention. The front structure 210 includes back panel 212 and a front panel 214. The back structure 220 includes a front panel 228 and a back panel 232. A pair of latch elements 282, 284 extend from front panel 228. When front structure 210 is in the closed position, a gap is formed between front structure 210 and back structure 220. The gap allows for a thickness of handheld computer 100. From the closed position, front structure 210 can move to positions B and C, and intermediate positions therebetween.

Figure 6:
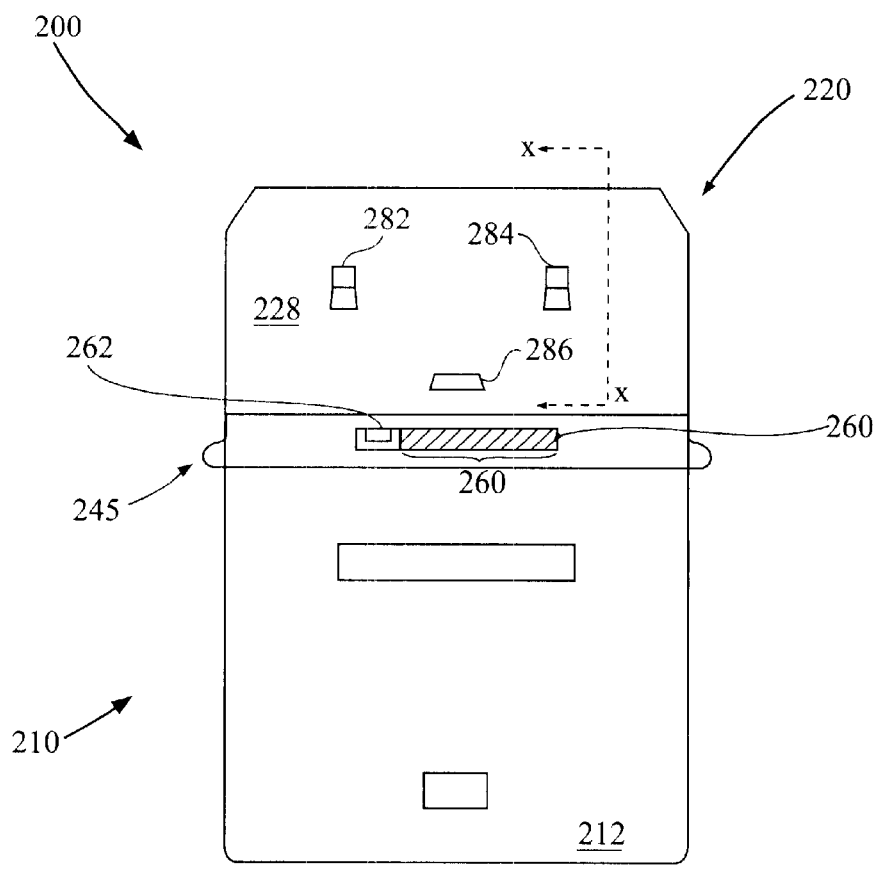
FIG. 6 is a top view of an attachment device in a fully-extended position, under an embodiment of the invention.

FIG. 6 is a top view of attachment device 200, with front structure 210 positioned to be extended 180 degrees from back structure 220. An embodiment provides attachment device 200 to be electronically enabled. To this end, attachment device 200 includes a connector 260 for extending communications to and from handheld computer 100. The connector 260 may be provided on connecting structure 245.

In an embodiment, a connector opening 262 may be provided on coupling structure 245, adjacent to connector 260. The connector 260 may include a plurality of connector elements. The connector elements of connector 260 may be positioned to mate with only some of the connector elements of a peripheral connector 160 (see FIG. 8) of handheld computer 100. The peripheral connector 160 of handheld computers such as PALM organizers is provided on a bottom edge or surface, between front face 105 (FIG. 3) and back face 115. hi one configuration, connector 260 includes a serial connector that mates with the connector elements of the peripheral connector 160 that provide serial connectivity. The connector 260 may also include one or more power pins or connector elements that connect to connector elements of peripheral connector 160, to provide power to or derive power from an internal battery of handheld computer 100. The power signals may be provided on separate power input and power output signal lines. In another configuration, connector 260 includes a universal serial bus (USB) connector to mate with USB connector elements of the handheld computer's peripheral connector. While connector 260 is connected to a portion of the handheld computer's peripheral connector 160, connector opening 262 provides a connector of another device access to the same peripheral connector. Therefore, a device such as a cradle may be used simultaneously with the attachment device 200.

The front panel 228 of back structure 220 provides first latch member 282 and second latch member 284. The third insertion member 286 may be opposed towards a bottom of back structure 220. The front panel 228 of back structure 220 is aligned to oppose back panel 212 of front structure 210 when front structure 210 is in the closed position A.

Figure 7:
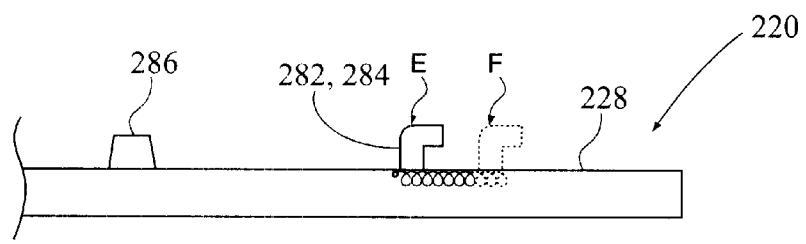
FIG. 7 is a cross-sectional view cut along lines of FIG. 6, under an embodiment of the invention.

FIG. 7 is a side cross-sectional view cut along lines X—X of FIG. 6, under an embodiment. The latch elements 282, 284 extend from front panel 228 of back structure 220. An embodiment provides that latch elements 282, 284 are moveable from an unengaged position (E) into a biased position (F). In the biased position, the latch elements 282, 284 are engaged with corresponding apertures on the back face of handheld computer 100 to detachably couple attachment device 200 to handheld computer 100. An example of a construction for latch elements 282, 284 is provided in U.S. patent application Ser. No. 09/745,325, entitled "Detachable Coupling for Handheld Computer and Peripheral Attachment Scheme," filed Dec. 20, 2000, and naming McClendon et al. as inventors, the aforementioned application being hereby incorporated by reference. Another example of a construction for latch elements 282, 284 is provided in U.S. Pat. No. 6,115,248, entitled "Detachable Securement of an Accessory Device to a Handheld Computer." The third member 286 is positioned to insert into a corresponding aperture on back face 115. An embodiment provides that third member 286 is immobile, and extends into back face 115 to provide a stabilization or alignment effect.

Figure 8:
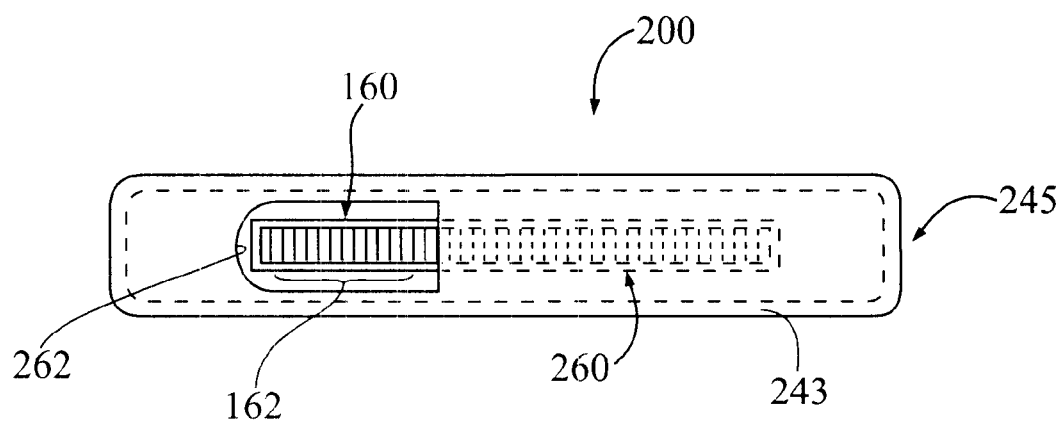
FIG. 8 is a bottom view of an electronically-enabled attachment device coupled to a handheld computer, under an embodiment of the invention.

FIG. 8 is a bottom view of attachment device 200 coupled to handheld computer 100. An exterior surface 243 of the connector structure 245 is shown. The aperture 262 is formed into connecting structure 245. The aperture 262 is positioned adjacent to connector 260 (shown in phantom), which is on an interior surface of connecting structure 245. The opening 262 exposes some of the connector elements 162 of the handheld computer's peripheral connector 160. In this way, a portion of the peripheral connector 160 may be mated to another device. In one embodiment, the exposed connector elements 162 are for carrying a USB signal, while connector 260 is for carrying a serial signal and/or a power signal.

Figure 9:
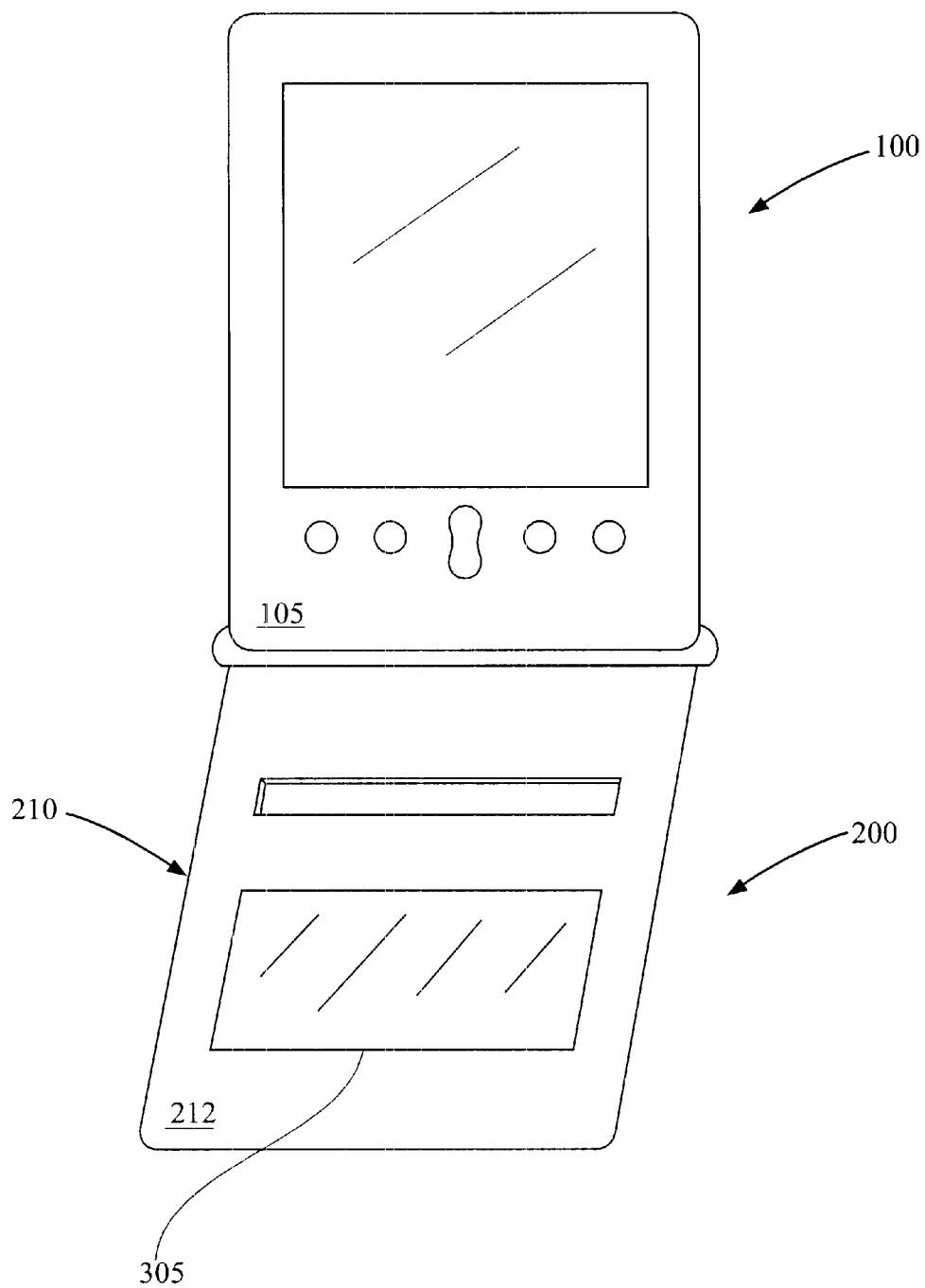
FIG. 9 is a front view of an attachment device coupled to a handheld computer, the attachment device being in a partially-extended position and including one or more accessory features, under an embodiment of the invention.

FIG. 9 illustrates accessory features incorporated with attachment device 200. The accessory features may be incorporated into any surface of attachment device 200, including back panel 212 of front structure 210. The attachment device 200 is coupled so that front structure 210 extends from the front face 105 of handheld computer 100. In one implementation, the accessory feature is a pocket 305, for holding items like business cards. The pocket 305 may be formed of a tensile material, such as nylon, plastic, leather or fabric. The pocket 305 may be attached to back panel 212 through glue, mechanical fasteners, stitches, or other types of mechanical connections. Other examples of accessory features that can be incorporated into back panel 212 include pen holders, paper notebooks, key rings, currency holders and other items.

C. Electronically Enabled Attachment Device

The attachment device 200 may be integrated with an electrical component that mates with handheld computer 100. The connector 260 may be used to extend communications and other signals between attachment device 200 and handheld computer 100.

Figure 10:
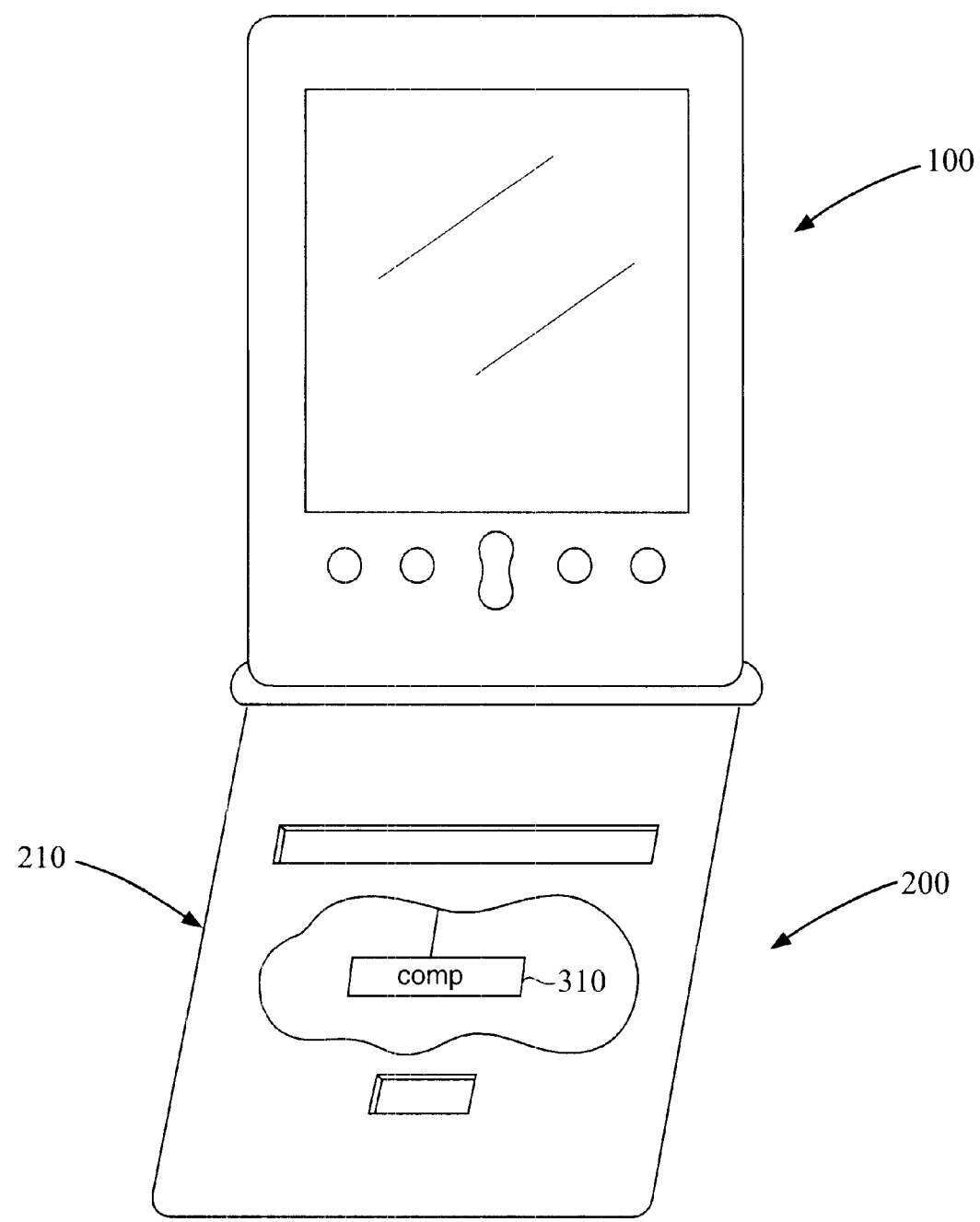
FIG. 10 is a front view of an electronically enabled attachment device coupled to a handheld computer, the attachment device being in a partially-extended position and including one or more electrical components, under an embodiment of the invention.

FIG. 10 illustrates attachment device 200 integrated with an electrical component 310. The electrical component 310 may be integrated into a casing of front structure 210. An electrical signal may be extended from the electrical component 310 to a processor 440 (FIG. 14) or other internal component of handheld computer 100. The electrical signal may be carried through connector 260 and the peripheral connector 150 of handheld computer 100. As will be further described, examples of electrical component 310 include a processor, a memory, a battery, a transmitter, a modem, and an analog-to-digital converter. While embodiments described with FIG. 1 0 illustrate electrical component 310 integrated into front structure 210, other embodiments may include electrical components in other housing portions of attachment device 200, including back structure 220 and/or connecting structure 245. In another embodiment, connecting structure 245 may extend communications between components within front structure 210 and back structure 220.

Figure 11:
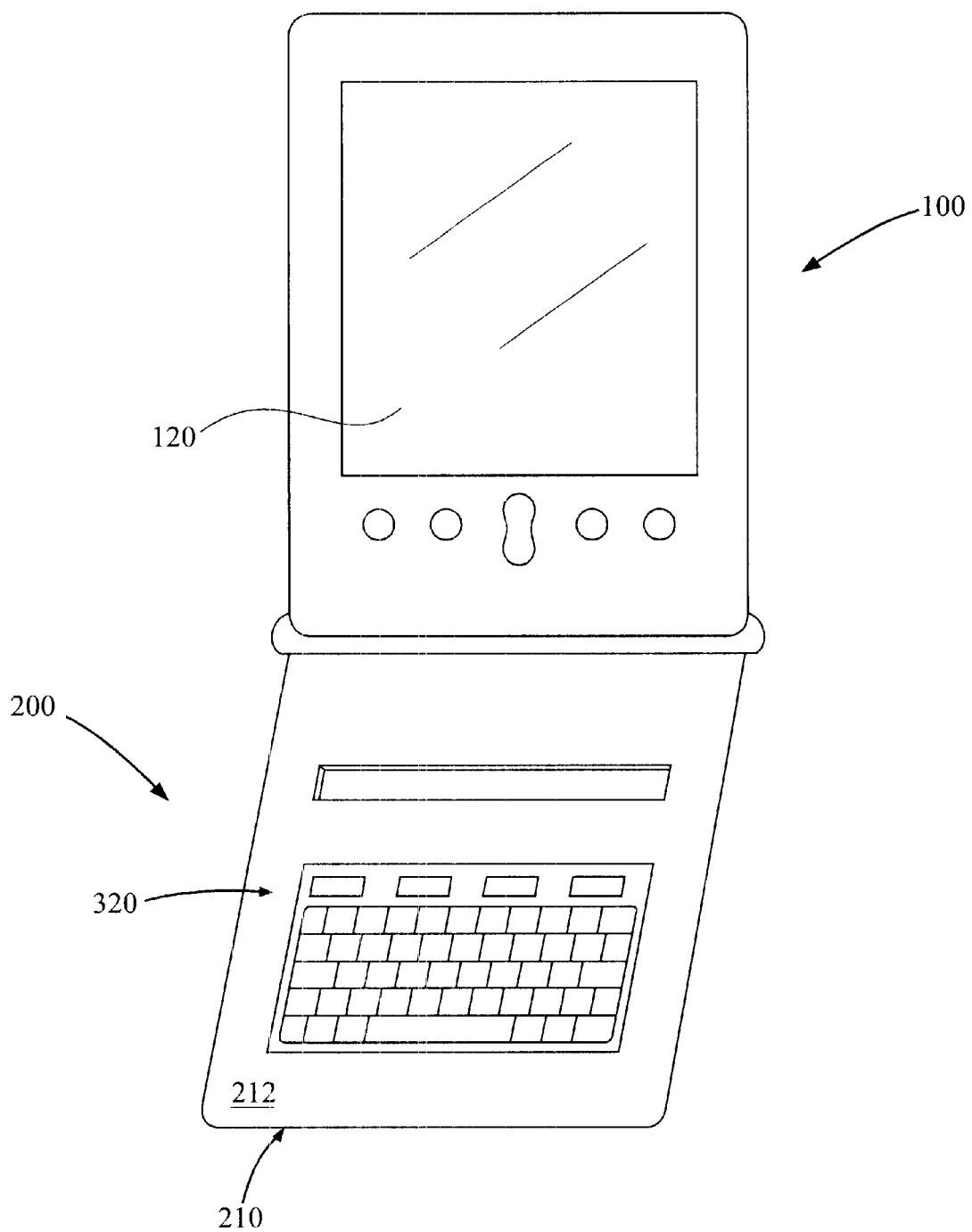
FIG. 11 is a front view of an electronically enabled attachment device coupled to a handheld computer, the attachment device being in a partially-extended position and including a keyboard device, under an embodiment of the invention.

FIG. 11 illustrates attachment device 200 integrated with a keyboard device 320, under an embodiment of the invention. The keyboard 320 may be positioned on the back panel 212 of front structure 210. The front structure 210 may be moved into an extended position, oriented at about 90 degrees relative to back structure 220. The keyboard device 320 may be relatively small, such as dimensioned for one hand or a stylus tip. The connector 260 may be used to signal a processor of handheld computer 100 input received on keyboard device 320. The keyboard 320 may be operated by a user when front structure 210 is in a partially-extended position, so that a user may type in input and see output on display 120 of handheld computer 100.

Figure 12:
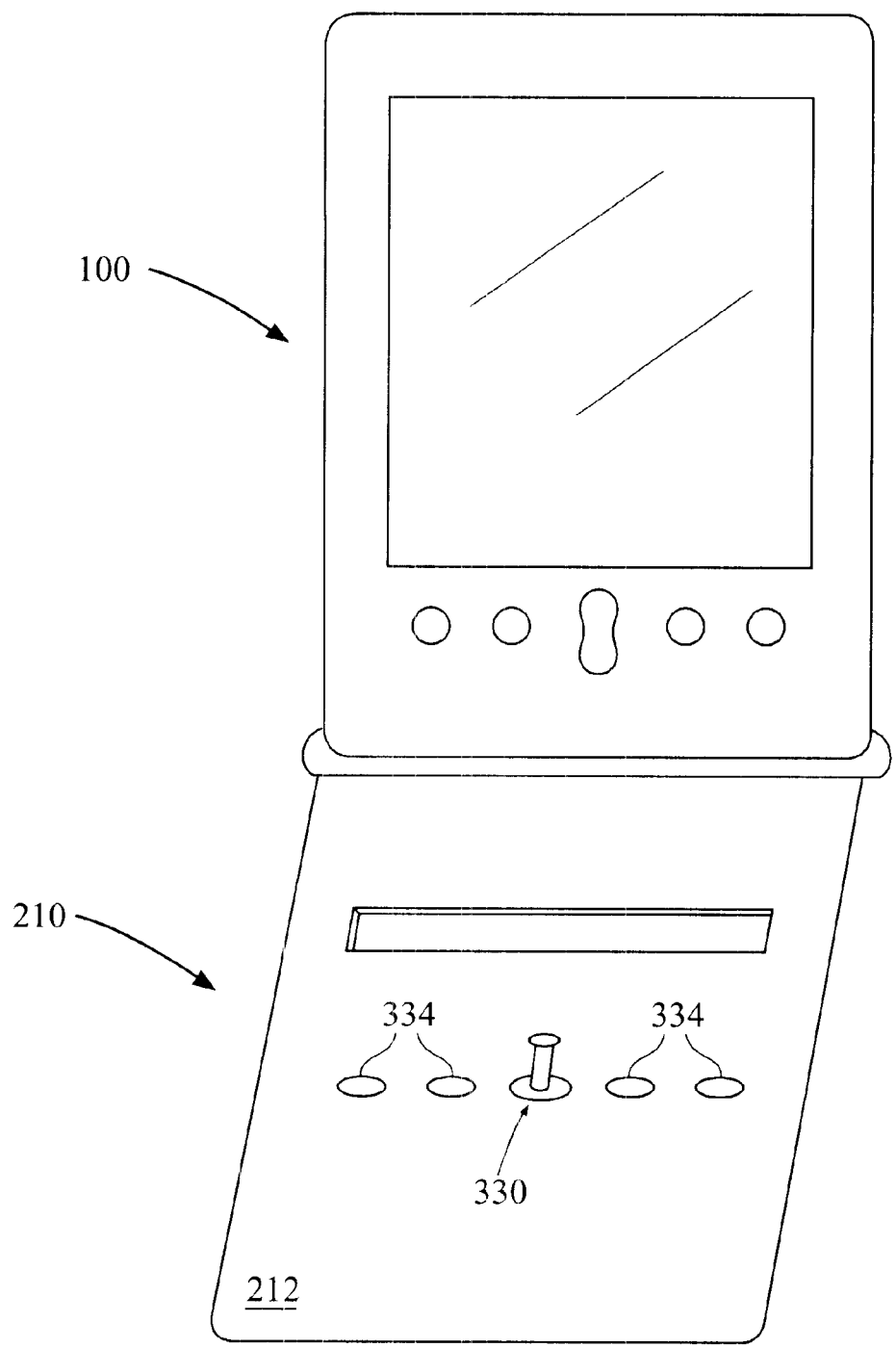
FIG. 12 is a front view of an electronically enabled attachment device coupled to a handheld computer, the attachment device being in a partially-extended position and including a game pad, under another embodiment of the invention.

FIG. 12 illustrates attachment device 200 configured to incorporate a game module. The game module may be incorporated on back panel 212 of front structure 210. In one embodiment, the game module includes a joystick 330 and a plurality of buttons 334. The joystick 330 may create an analog signal that is converted into a digital format for processing by handheld computer 100. The analog signal may be carried to an analog-digital converter of handheld computer 100 over connector 260 (FIG. 8). Alternatively, front structure 210 may include an embedded analog-to-digital converter for converting input received through use of joystick 330 into the digital format. The input may then be signaled to the processor 440 of handheld computer 100 (FIG. 14).

Figure 13:
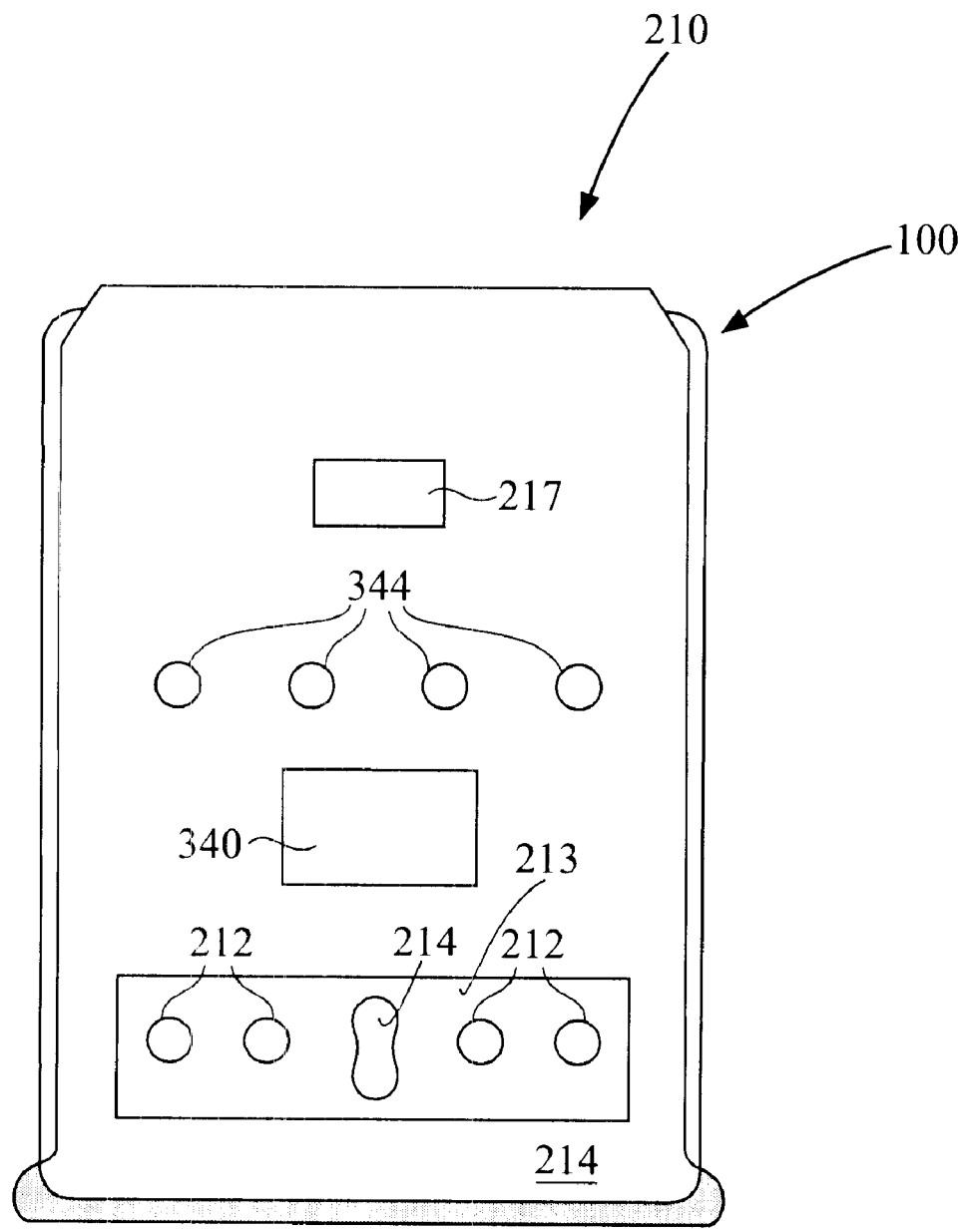
FIG. 13 is a front view of an electronically enabled attachment device coupled to a handheld computer, the attachment device being in a closed position and including an audio recorder, under another embodiment of the invention.

FIG. 13 illustrates an embodiment where input mechanisms and other electrical components are provided on another panel or surface of attachment device 200. In an embodiment, front panel 214 of front structure 210 provides input features that are actuatable to communicate with components of handheld computer 100. In one embodiment, front panel 214 includes a microphone 340 and buttons 344 for operating an audio recorder. Internal processing equipment may be provided within a casing of front structure 210 to receive voice input and to convert the voice input into a digital signal that is carried over connector 260 to a processor of handheld computer 100. In an embodiment, first opening 213 may also expose the input buttons 212 and pivot buttons 214 of handheld computer 100. A second opening 217 may expose a portion of display 120. The second opening 217 may be used to expose the time, for example, on a corresponding portion of display 120.

D. Hardware Diagram

Figure 14:
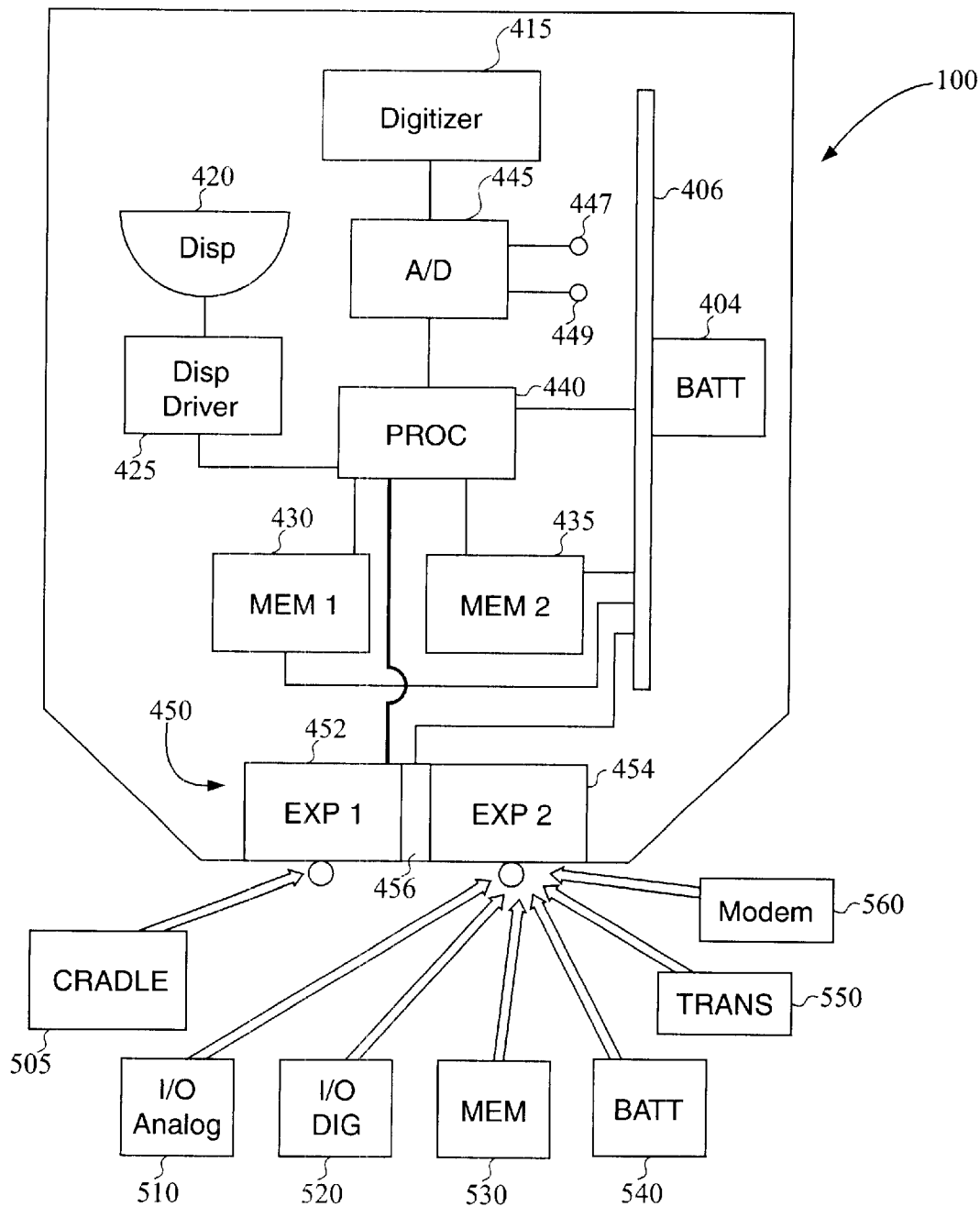
FIG. 14 is a hardware block diagram of a handheld computer coupleable to any one of a plurality of electronically enabled attachment devices, under an embodiment of the invention.

FIG. 14 is a block diagram illustrating components of handheld computer 100 mated with an electronically enabled attachment device 200 (see e.g. FIG. 1). As will be described, attachment device 200 may include any one of a plurality of electrical components. In an embodiment, handheld computer 100 includes a processor 440 coupled to a first memory 430 and to a second memory 435. The first memory 430 may correspond to non-volatile memory, and second memory 435 may correspond to volatile memory. The processor 440 is coupled to a display driver 425, which configures data to create an image on display 420. An analog-to-digital converter 445 is coupled to a digitizer 415, and/or other analog device. The analog-to-digital converter 445 signals an analog input received from digitizer 415 into a digital format for processor 440. In one embodiment, analog-to-digital converter 445 may includes a first open channel 447 and a second open channel 449. A battery module 404 signals power to multiple components of handheld computer 100 over a power bus 406.

In an embodiment, handheld computer 100 includes a peripheral connector 450 having multiple expansion ports. The peripheral connector 450 extends communications from processor 440 to one or more peripheral devices that may be integrated with attachment device 200. In one embodiment, peripheral connector 450 includes a serial port 454 and a USB port 452 formed on the same peripheral connector 450. The peripheral connector 450 may also include a power output element 456. The power output element 456 is coupled to power bus 406.

Components that can be integrated into attachment device 200 to electrically communicate with components of handheld computer 100 include analog input devices 510, digital input devices 520, memory 530, battery capacity 540, a transmitter 550, and/or a modem 560. The components may be integrated into any housing section of attachment device 200, including front structure 210 and/or back structure 220. In an embodiment, attachment device 200 electrically communicates with handheld computer 100 over the serial port 454. The connector elements of peripheral connector 450 corresponding to the USB port 452 may be exposed, as illustrated by FIG. 8. Some of the components for attachment device 200 may also couple to power output element 456 to receive power from battery 404.

By leaving USB port 452 exposed, another peripheral device may connect to peripheral connector 450 to electrically couple to processor 440 or other component of handheld computer 100. In an embodiment, the connector opening 262 of attachment device 200 allows for a cradle 505 to couple to the USB port 452 while connector 260 is electrically coupled to the serial port connector 454.

E. Other Embodiments

FIG. 15 is a back view of an attachment device 600 having another housing configuration, under another embodiment of the invention. The attachment device 600 includes a back structure 620 that secures into back face 115. A front structure 610 is moveably coupled to back structure 620 to move across one of the lateral sides 103 and extend over front face 105 (see FIG. 1) of handheld computer 100. The front structure 610 is moveably coupled to back structure 620 to swing in front of and away from front face 105.

In one embodiment, a flex member 645 couples front structure 610 to back structure 620. The front structure 610 may be moveably coupled to back structure 620 to swing so that a front panel 612 of front structure 610 is positionable to be adjacent a back panel 632 of back structure 620.

FIG. 16 is a side-view of attachment device 600 coupled to handheld computer 100, as shown with an embodiment described with FIG. 15. The front structure 610 couples to back structure 620 to extend from one of the handheld computer's lateral sides 103 so as to extend over front face 105. A back panel 614 of front structure 610 may be moved against front face 105 of handheld computer 100. The back panel 614 may cover portions or all of front face 105, including display 120.

In an embodiment, attachment device 600 is also electronically enabled. To this end, attachment device 600 may be provided a bottom portion 630 having a connector 640. The connector 640 is positioned to mate with peripheral connector 160 (FIG. 8) of handheld computer 100.

Figure 17:
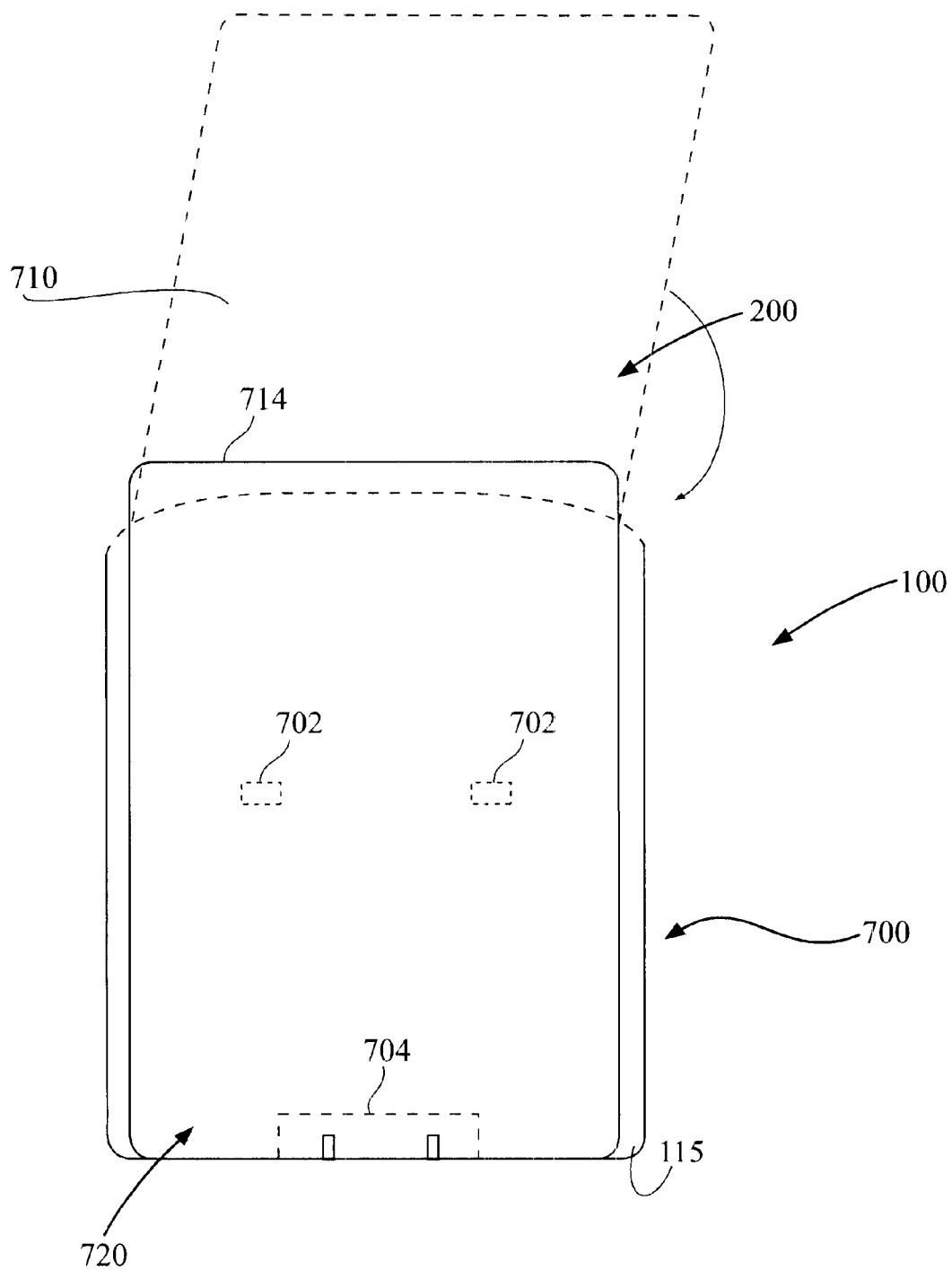
FIG. 17 is a back view of an attachment device having a housing configuration to extend over a top of a handheld computer and over the handheld computer's front face, under an embodiment of the invention.

FIG. 17 illustrates an attachment device 700 having another housing configuration. A back structure 720 couples into a back face 115 of handheld computer 100 at connection points 702, 704. The connection points 702, 704 include detachable mechanical couplings, such as latch elements 222, 224 that engage apertures into back face 115. The connection point 704 may include a snap-in coupling. A front structure 710 (shown in phantom) of attachment device 700 moveably couples to a top segment 714 of back structure 720. The front structure 710 may be moveable into a position adjacent front face 105 of handheld computer 100. A flex member, hinged device or other structure may be used to couple front structure 710 to back structure 720.

F. Conclusion

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. An attachment device for a handheld computer, the handheld computer including a front face providing a display, and a back face opposing the front face, the attachment device comprising:
   a first structure dimensioned to extend over at least a portion of the back face of the handheld computer when the attachment device is coupled to the handheld computer;
   a coupling mechanism extending from the first structure, the coupling mechanism configured to include one or more members that are insertable into the back face of the handheld computer to detachably couple the attachment device to the handheld computer; and
   a second structure moveably coupled to the first structure so as to be positionable in a first position to extend at least partially over the front face of the handheld computer.

2. The attachment device of claim 1, wherein the coupling mechanism biases the one or more members to detachably couple the attachment device to the handheld computer.

3. The attachment device of claim 1, wherein the one or more members of the coupling mechanism include a plurality of latch structures, the latch structures being positioned to engage corresponding apertures on the back face of the handheld computer.

4. The attachment device of claim 1, wherein the first structure includes a front panel, the one or more members of the coupling mechanism extending from the front panel of the first structure so as to retain the front panel against the back face of the handheld computer when the attachment device is coupled to the handheld computer.

5. The attachment device of claim 1, wherein the second structure includes a back panel that is moveably retained to be adjacent to the front face of the handheld computer when the second structure is moved to the first position.

6. The attachment device of claim 1, further comprising a double hinge moveably coupling the first structure and the second structure.

7. The attachment device of claim 1, further comprising a flexible member moveably coupling the first structure and the second structure.

8. The attachment device of claim 1, where in the second structure is moveable at least 90 degrees from the first position to an extended position.

9. The attachment device of claim 1, wherein the second structure includes a front panel that is exterior to the back panel when the second structure is moved into the first position, and wherein a portion of the second structure includes one or more openings so that a portion of the front face is viewable when the second structure is in the first position.

10. The attachment device of claim 1, wherein the second structure includes a front panel that is exterior to the back panel of the second structure when the second structure is moved into the first position, and wherein a portion of the second structure includes one or more translucent regions so that a portion of the front face is viewable when the second structure is in the first position.

11. The attachment device of claim 1, further comprising an electronic component retained within at least one of the first structure or the second structure.

12. The attachment device of claim 3, wherein the latch structures are configured to bias towards one another in order to engage the corresponding apertures on the back face of the handheld computer when the one or more members are inserted into the back face of the handheld computer.

13. The attachment device of claim 5, wherein the second structure extends across a majority of the front face of the handheld computer when moved into the first position.

14. The attachment device of claim 5, further comprising a pocket on the back panel of the second structure.

15. An electronically enabled attachment device for a handheld computer, the handheld computer including a front face providing a display, a back face opposing the front face, and a peripheral connector, the attachment device comprising:
   a first structure dimensioned to extend over at least a portion of the back face of the handheld computer when the attachment device is coupled to the handheld computer;
   a coupling mechanism extending from the first structure, the coupling mechanism including one or more members that are insertable into the back face of the handheld computer to detachably couple the attachment device to the handheld computer;
   a second structure moveably coupled to the first structure so as to be positionable in a first position extend at least partially over the front face of the handheld computer; and
   a first connector coupled to the second structure and positioned to contact the peripheral connector of the handheld computer.

16. The electronically enabled attachment device of claim 15, further comprising a hinge structure interconnecting the first structure with the second structure.

17. The electronically enabled attachment device of claim 15, wherein the first connector engages only a portion of the peripheral connector so that another connector from another device can engage the peripheral connector when the second structure is in the engaged position.

18. The electronically enabled device of claim 15, further comprising an input mechanism retained within the first structure or the second structure, the input mechanism being operable to generate an input signal for a processor of the handheld computer to be signaled over the first connector.

19. The electronically enabled device of claim 15, further comprising an electrical component selected from a group of electrical components consisting of a transmitter, a modem, and a battery.

20. The electronically enabled device of claim 15, further comprising a memory that receives communications from a processor of the handheld computer.

21. The electronically enabled device of claim 15, further comprising a processor that extends communications with a processor of the handheld computer.

22. The electronically enabled device of claim 15, wherein the first connector is positioned to contact the peripheral connector of the handheld computer when the second structure is moved into the first position.

23. The electronically enabled attachment device of claim 16, wherein the first connector extends from the hinge structure.

24. The electronically enabled attachment device of claim 16, wherein the hinge structure comprises a double joint.

25. The electronically enabled attachment device of claim 16, wherein the hinge structure comprises a flex member.

26. The electronically enabled attachment device of claim 17, wherein the peripheral connector includes a first plurality of contact elements for carrying a universal serial bus signal, a second plurality of contact elements for carrying a serial port signal, and wherein the first connector engage the second plurality of contact elements while leaving the first plurality of contact elements exposed.

27. The electronically enabled device of claim 18, wherein the input mechanism includes a keyboard comprising a plurality of input keys.

28. The electronically enabled device of 24, wherein the input mechanism creates an analog input signal.

29. The electronically enabled device of claim 18, wherein the input mechanism includes an input mechanism selected from a group consisting of a joystick, multi-directional pad, and button.

30. The electronically enabled attachment device of claim 26, wherein the peripheral connector includes one or more contact elements for carrying a power signal, and wherein the first connector contacts the one or more contact elements for carrying the power signal.

31. The electronically enabled device of claim 28, further comprising an analog-to-digital converter retained within at least one of the first structure or the second structure, the analog-to-digital converter converting the analog input signal to a digital input signal before forwarding the digital input over the first connector.

32. The electronically enabled device of claim 30, further comprising an electrical component retained with the first structure or the second structure, the electrical component being coupleable over the first component to the one or more contact elements of the peripheral connector for carrying the power signal from a battery of the handheld computer, the power signal powering the electrical component.

33. A handheld computer assembly comprising:
a handheld computer including:
   a first housing having a front face and a back face opposing the front face;
   a display provided on the front face of the first housing; and
   a peripheral connector provided on a surface of the first housing;
an attachment device including:
   a second housing including a first structure moveably coupled to a second structure, the first structure being dimensioned to extend over at least a portion of the back face of the handheld compute when the attachment device is coupled to the handheld computer;
   an electrical component retained within the second housing;
   a coupling mechanism including one or more members that are insertable into the back face of the first housing to detachably attach a front panel of the second structure to the back face of the first housing, so that the first structure is positionable against the front face of the first housing; and
   a first connector positioned on the second housing to engage the peripheral connector when the coupling mechanism attaches the front panel of the second structure to the back face of the first housing.

34. The handheld computer assembly of claim 33, wherein the first connector is positioned to engage the peripheral connector when the coupling mechanism attaches the front panel of the second structure to the back face of the first housing, and when the first structure is moved into a position relative to the second structure and relative to the front face of the first housing.

35. A handheld computer assembly comprising:
a handheld computer including:
   a first housing having a front face and a back face opposing the front face;
an attachment device including:
   a second housing including a first structure moveably coupled to a second structure, the first structure being dimensioned to extend over at least a portion of the back face of the handheld compute when the attachment device is coupled to the handheld computer; and
   a coupling mechanism including one or more members that are insertable into the back face of the first housing to detachably attach the second housing to the first housing.

36. The handheld computer assembly of claim 35, wherein the one or more members of the coupling mechanism include a biased latch member.

37. An attachment device for a handheld computer, the handheld computer including a front face providing a display, and a back face opposing the front face, the attachment device comprising:
a first structure;
a coupling mechanism extending from the first structure, the coupling mechanism configured to insert into the back face of the handheld computer and detachably couple the attachment device to the handheld computer; and
a second structure moveably coupled to the first structure to extend into a first position adjacent to the front face of the handheld computer; and
wherein the second structure is coupled so that an end of the second structure is moveable over 180 degrees from the first position.

* * * * *

UNITED STATES PATENT AND TRADEMARK OFFICE
CERTIFICATE OF CORRECTION

PATENT NO. : 6,462,942 B1
APPLICATION NO. : 09/872649
DATED : October 8, 2002
INVENTOR(S) : McClendon et al.

It is certified that error appears in the above-identified patent and that said Letters Patent is hereby corrected as shown below:

In the Claims:

Claim 8, column 10, line 20, replace "where in" with --wherein--.
Claim 28, column 11, line 45, replace "24" with --claim 18--.

Signed and Sealed this

Twenty-eighth Day of November, 2006

JON W. DUDAS
*Director of the United States Patent and Trademark Office*